US009210789B2

(12) United States Patent
Porteanu et al.

(10) Patent No.: US 9,210,789 B2
(45) Date of Patent: Dec. 8, 2015

(54) DEVICE AND METHOD FOR GENERATING A PLASMA BY MEANS OF A TRAVELING WAVE RESONATOR

(75) Inventors: Horia-Eugen Porteanu, Berlin (DE); Roland Gesche, Seligenstadt (DE); Silvio Kuehn, Wandlitz (DE)

(73) Assignee: Forschungsverbund Berlin E.V., Berlin (DE)

( * ) Notice: Subject to any disclaimer, the term of this patent is extended or adjusted under 35 U.S.C. 154(b) by 431 days.

(21) Appl. No.: 13/508,607

(22) PCT Filed: Nov. 19, 2010

(86) PCT No.: PCT/EP2010/067815
§ 371 (c)(1), (2), (4) Date: May 8, 2012

(87) PCT Pub. No.: WO2011/061283
PCT Pub. Date: May 26, 2011

(65) Prior Publication Data

US 2012/0285934 A1 Nov. 15, 2012

(30) Foreign Application Priority Data

Nov. 19, 2009 (DE) ........................ 10 2009 046 881

(51) Int. Cl.
*B23K 9/00* (2006.01)
*B23K 9/02* (2006.01)
(Continued)

(52) U.S. Cl.
CPC .. *H05H 1/46* (2013.01); *H05H 1/24* (2013.01)

(58) Field of Classification Search
CPC .................................. H05H 1/46; H05H 1/24
USPC ............. 219/121.36, 121.54, 121.55, 121.59
See application file for complete search history.

(56) References Cited

U.S. PATENT DOCUMENTS 4,119,930 A * 10/1978 Abrams et al. ................ 359/245
4,686,407 A 8/1987 Ceperley
(Continued)

FOREIGN PATENT DOCUMENTS

DE 37 08 314 A1 9/1988
DE 696 20 453 T2 10/2002
(Continued)

OTHER PUBLICATIONS

German Office Action dated Mar. 4, 2013.
(Continued)

*Primary Examiner* — Dana Ross
*Assistant Examiner* — Lindsey C Teaters
(74) *Attorney, Agent, or Firm* — Norris McLaughlin & Marcus, P.A.

(57) ABSTRACT

A device for generating a plasma, comprises an alternating voltage source, a travelling wave resonator and coupling means that are designed to couple the alternating voltage generated by the alternating voltage source into the travelling wave resonator in such a manner that travelling electromagnetic waves are produced, wherein the travelling wave resonator is designed to increase the electric field strength of the travelling electromagnetic waves in such a manner that a plasma is ignited in a gas. The invention further relates to a method for generating a plasma, comprising the steps of: generating an alternating voltage; generating travelling electromagnetic waves in a travelling wave resonator by coupling said alternating voltage into the travelling wave resonator; and increasing the electric field strength of the travelling electromagnetic waves in the travelling wave resonator in order to ignite a plasma in a gas.

12 Claims, 9 Drawing Sheets

(51) Int. Cl.
*H05H 1/46* (2006.01)
*H05H 1/24* (2006.01)

(56) References Cited

U.S. PATENT DOCUMENTS

| | | | | |
|---|---|---|---|---|
| 5,029,173 | A | 7/1991 | Seguin | |
| 6,161,501 | A | 12/2000 | Liehr | |
| 2002/0050486 | A1 * | 5/2002 | Ishii et al. | 219/121.43 |
| 2003/0080685 | A1 | 5/2003 | Grotjohn et al. | |

FOREIGN PATENT DOCUMENTS

| | | | |
|---|---|---|---|
| WO | 00/19784 | A1 | 4/2000 |
| WO | 2004/062326 | A2 | 7/2004 |

OTHER PUBLICATIONS

International Search Report Dated Mar. 18, 2011, Mailed Mar. 30, 2011.
Translation of International Search Report Dated Mar. 18, 2011, Mailed Mar. 30, 2011.

* cited by examiner

DEVICE AND METHOD FOR GENERATING A PLASMA BY MEANS OF A TRAVELING WAVE RESONATOR

This application is a 371 application of PCT/EP2010/067815 filed Nov. 19, 2010, which claims foreign priority benefit under 35 U.S.C. §119 of Germany Patent application 10 2009 046 881.1 filed Nov. 19, 2009.

The invention relates to a device for generating a plasma and to a method for generating a plasma as disclosed hereinafter.

Resonators are used for impedance transformation in various uses of plasmas that take place at atmospheric pressure or in the low-pressure range and are operated with high-frequency waves or microwaves. As a result of resonant transformation, said resonators generate the high voltage required to ignite a plasma. In discrete systems, said voltage is provided at a terminal; in case of line resonators, it is provided at a particular place along the line. The places where the currents and voltages are provided vary in accordance with the wavelength and, consequently, the frequency. It is easy to carry out homogeneous plasma treatment across a surface if the dimensions of the surface area involved are much smaller than the wavelength. If said dimensions are in the order of magnitude of the wavelength or even larger, homogeneous treatment is not possible at first. There are periodic structures, such as slot radiators, which are based on standing waves and whose intensity will therefore always vary periodically in accordance with the wavelength.

Plasma sources for large-area plasma treatment are known. However, said sources require a vacuum; operation at normal pressure would be advantageous. If the known dot-shaped plasma sources operating at atmospheric pressure are used, plasma treatment of larger surfaces is time-consuming since the plasma source must be moved across the sample.

If the aforesaid drawbacks in the state of the art were eliminated, this would be relevant, for example, to uses in large-area medical skin treatment and other large-area uses of atmospheric plasmas as an alternative to arrays, for example in high-precision surface cleaning, surface activation, photoresist stripping, as well as to coatings in the fields of wafer treatment, photovoltaics, display technology and the production of facade glass or parts in the automobile industry.

From the state of the art, the following approaches are known to eliminate the aforesaid drawbacks: low frequencies are used where the wavelength by far exceeds the extent of the surface to be treated; either the substrate or the plasma source is moved to ensure homogenisation; different operating modes are combined with different inhomogeneities (superimposed or activated periodically); and special geometries are used to compensate for inhomogeneities, for example changed electrode spacings.

These approaches have the drawback that the inhomogeneities cannot be prevented completely and/or their prevention requires complex apparatus to be installed, and standing waves that still occur continue to cause a non-uniform electrical load on the components.

Travelling wave resonators where travelling electromagnetic waves are made to resonate are known, for example, from L. J. Milosevic, R. Vaurey: Traveling-Wave Resonators, IRE Transactions on Microwave Theory and Techniques, April 1958, pp. 136-143 and from José A. Brandão Faria: A Novel Approach to Ring Resonator Theory Involving Even and Odd Mode Analysis, IEEE Transactions on Microwave Theory and Techniques, volume 57, No. 4, April 2009, pp. 856-862. However, the use of said travelling wave resonators for plasma generation is not known from the state of the art.

U.S. Pat. No. 7,218,180 discloses a travelling wave resonator that is de-attenuated by means of individual semiconductor amplifier elements and does not require a final resistance.

The object of the present invention is to provide a device and a method for generating a plasma which eliminate the drawbacks in the state of the art described above and allow, in particular, a plasma to be generated that is spatially homogeneous over large distances. In particular, it is an object of the present invention to use electromagnetic waves to generate a plasma that is spatially homogeneous over distances which are comparable to the wavelength of the electromagnetic waves or exceed said wavelength.

According to the invention, the aforesaid object is achieved by means of a device for generating a plasma having the features set forth hereinafter and a method for generating a plasma having the features set forth hereinafter.

The device for generating a plasma according to the invention comprises an alternating voltage source, a travelling wave resonator and coupling means that are designed to couple the alternating voltage generated by the alternating voltage source into the travelling wave resonator in such a manner that travelling electromagnetic waves are produced. The travelling wave resonator is designed to increase the electric field strength of the travelling electromagnetic waves in such a manner that a plasma is ignited in a gas. The use of travelling electromagnetic waves ensures that the electric field strength is spatially homogeneous in average over time since travelling waves, unlike standing waves, have no knots or bellies.

In this document, travelling waves mean moving waves, i.e. waves that propagate in one direction, wherein the points of disappearing or extreme field strength travel in the direction of propagation. In contrast, a standing wave comprises fixed points of disappearing or extreme field strength, which are called knots or bellies. The so-called standing-wave ratio can be used to quantify the degree to which a wave that is propagated in a waveguide has the character of a standing or a moving wave. Said ratio is defined by $(E_1+E_2)/(E_1-E_2)$, wherein $E_1$ and $E_2$ are the amplitudes of the two wave components that are propagating in opposite directions. In case of a true standing wave, the two wave components are present with equal strength and the standing wave ratio is infinite. A true moving wave propagating in the forward direction comprises only the wave component $E_1$ and the standing wave ratio is 1. This means, coupling with a directional characteristic is an essential prerequisite for the production of travelling waves. The more one wave component is preferred to the other during directional coupling, the more pronounced is the travelling wave character of the waves that propagate in the resonator line and the less is the spatial homogeneity of the generated plasma affected by the spatially periodic interference between the two wave components.

A travelling wave resonator is a device where travelling electromagnetic waves are made to resonate. As a prerequisite, the travelling wave resonator must be designed in such a manner that the travelling waves propagate in the direction of propagation in such a manner that there is constructive interference between travelling waves that are fed in at different times. While in case of standing waves resonance is typically achieved by reflecting the waves back and forth between two reflective elements, preferably covering a distance that is an integer multiple of the wavelength in each case, resonance in a travelling wave resonator can be achieved, for example, by guiding the waves along a closed-loop path, preferably covering a distance that is an integer multiple of the wavelength in each case.

A distinction must be made between travelling wave resonators and normal waveguides. In the latter, there will be constructive interference of the reflections on the side walls of the waveguide perpendicular to the direction of propagation at certain wavelengths and travelling waves may propagate in the waveguide at said wavelengths. However, this phenomenon is different from resonance in the sense described herein since, in this case, the travelling waves only propagate individually in the direction of propagation and travelling waves fed in at different times do not interfere with each other. Interference between travelling waves fed in at different times and, as a result, resonance in the sense described herein are not achieved until such a waveguide is designed as a closed loop.

The alternating voltage source can be designed, for example, as an oscillator that synchronizes with the travelling wave resonator. The coupling means can be, for example, any desired directional couplers. The gas can be, for example, air or any desired process gas. The area where a plasma is ignited in the gas is arranged in such a manner that the plasma is accessible from the outside for plasma treatment.

The travelling wave resonator preferably comprises a closed-loop waveguide and/or is designed as a closed-loop waveguide. This ensures that travelling waves can continually propagate in the travelling wave resonator, without reaching an end where reflection and/or losses occur(s). The loop length of the closed-loop waveguide is preferably an integer multiple of the wavelength corresponding to the frequency of the alternating voltage source. This ensures that a wave circulating in the travelling wave resonator constructively interferes with itself once it has passed the loop, thus achieving the highest possible resonance and increase in field strength.

Preferably, the distance between two areas of the travelling wave resonator where the electric potential of the electromagnetic waves is essentially in phase opposition in the operating state is small enough to ensure that the electric field strength between the two areas is sufficient to ignite a plasma in the gas in the operating state. As a result, the field strength is increased even further, so that a lower source voltage and/or a lower resonance is/are sufficient to generate a plasma. Preferably, the two areas of the travelling wave resonator where the electric potential of the electromagnetic waves is essentially in phase opposition in the operating state are two areas within the cross-section of the resonator line.

The device can further comprise a process gas inlet for supplying a process gas into the area of plasma ignition. This ensures that a plasma can be ignited in any desired process gas.

In a preferred embodiment of the invention, the travelling wave resonator comprises a tube that is provided with a slot and dimensioned in such a manner that the electric potential of the electromagnetic waves is essentially in phase opposition at the two opposite edges of the slot in the operating state. This shape ensures a particularly high increase in field strength. The circumference of the tube is preferably half the wavelength corresponding to the frequency of the alternating voltage source, which also contributes to a particularly high increase in field strength. The tube can be, for example, a round tube or a rectangular tube.

The coupling means can comprise two conductor loops that are arranged coaxially. This ensures that coupling can be properly controlled. Preferably, the distance between the two conductor loops is a quarter of the wavelength corresponding to the frequency of the alternating voltage source. This ensures optimum constructive interference in the direction of propagation and destructive interference in the opposite direction, so that the travelling wave initiated is as "pure" as possible, i.e. without a standing wave component. The voltages applied to the two conductor loops preferably have a phase difference of $\pi/2$ to each other.

The tube preferably comprises four quadrant-shaped parts, wherein a linear part is arranged between each two of said quadrant-shaped parts. This is a particularly easy way to achieve a shape where long linear areas for generating a spatially homogeneous plasma are provided. One or both of the pairs of opposite linear parts can be omitted; in particular, the tube can be circular. Coupling can be done into a linear part or into a quadrant-shaped part. In a design comprising two conductor loops, the two conductor loops can be, in particular, arranged on one of the linear parts. However, coupling can also be done into several areas of the travelling wave resonator.

In another preferred embodiment of the invention, the travelling wave resonator comprises a strip line comprising at least two strips, wherein the electric potential of the electromagnetic waves is essentially in phase opposition in two opposite areas of the at least two strips in the operating state.

In yet another preferred embodiment of the invention, the travelling wave resonator comprises a line comprising an inner conductor and an outer conductor that surrounds the inner conductor at least partly, wherein the inner conductor is not coaxial with the outer conductor.

The method for generating a plasma according to the invention comprises the steps of: generating an alternating voltage, generating travelling electromagnetic waves in a travelling wave resonator by coupling the alternating voltage into the travelling wave resonator, and increasing the electric field strength of the travelling electromagnetic waves in the travelling wave resonator in order to ignite a plasma in a gas.

Another aspect of the present invention relates to the use of the device according to the invention and/or of the method according to the invention for plasma treatment.

Any waveguide can be used as a travelling wave resonator. The waveguide is designed as a closed loop to allow propagation of travelling waves and prevent the occurrence of standing waves. The loop length is preferably an integer multiple of the wavelength, which is determined by the frequency of the alternating voltage generated by the alternating voltage source. A suitable coupling structure is used to initiate a wave that circulates in said resonator. With suitable impedance transformation, the amplitude of said circulating wave can be much higher than the amplitude of the initiating wave. In an optimal operating state, all input power available is converted into losses of the resonator waveguide in the idle state.

This allows the increase in field strength required to ignite a plasma. In the ignited state, the plasma absorbs the highest possible amount of energy supplied and produces a discharge that is almost homogeneous along the line and is supplied by the circulating wave.

The effective attenuation of the line changes between idle operation and the state when a plasma is ignited. This requires a compromise with regard to adjustment. In the optimal case, the power fed in is optimally adjusted to the plasma when the device operates with plasma, while in the idle state enough power to ignite the plasma is available along the line.

Additional measures can be taken to switch tuning between idle operation aimed at ignition and operation with plasma. It is also possible to use different degrees of excitation for ignition and plasma operation. Moreover, the local change in field distribution can be used to advantage during operation with and without plasma to ensure proper adjustment for both operating states.

Additional components can be provided to allow the adjustment during plasma operation to be set in order to optimize different plasma states, which may result e.g. from different high-frequency power, different process gases or different operating pressures during operation in the low-pressure range.

It is also possible to use the travelling wave resonator described here as an electrical component in other fields than plasma technology. Potential uses include the frequency-determining resonator in oscillator circuits and a large number of signal couplers, filters, directional lines and branches.

The invention will now be explained in more detail by means of exemplary embodiments and with reference to the attached drawings, in which.

Figure 1:
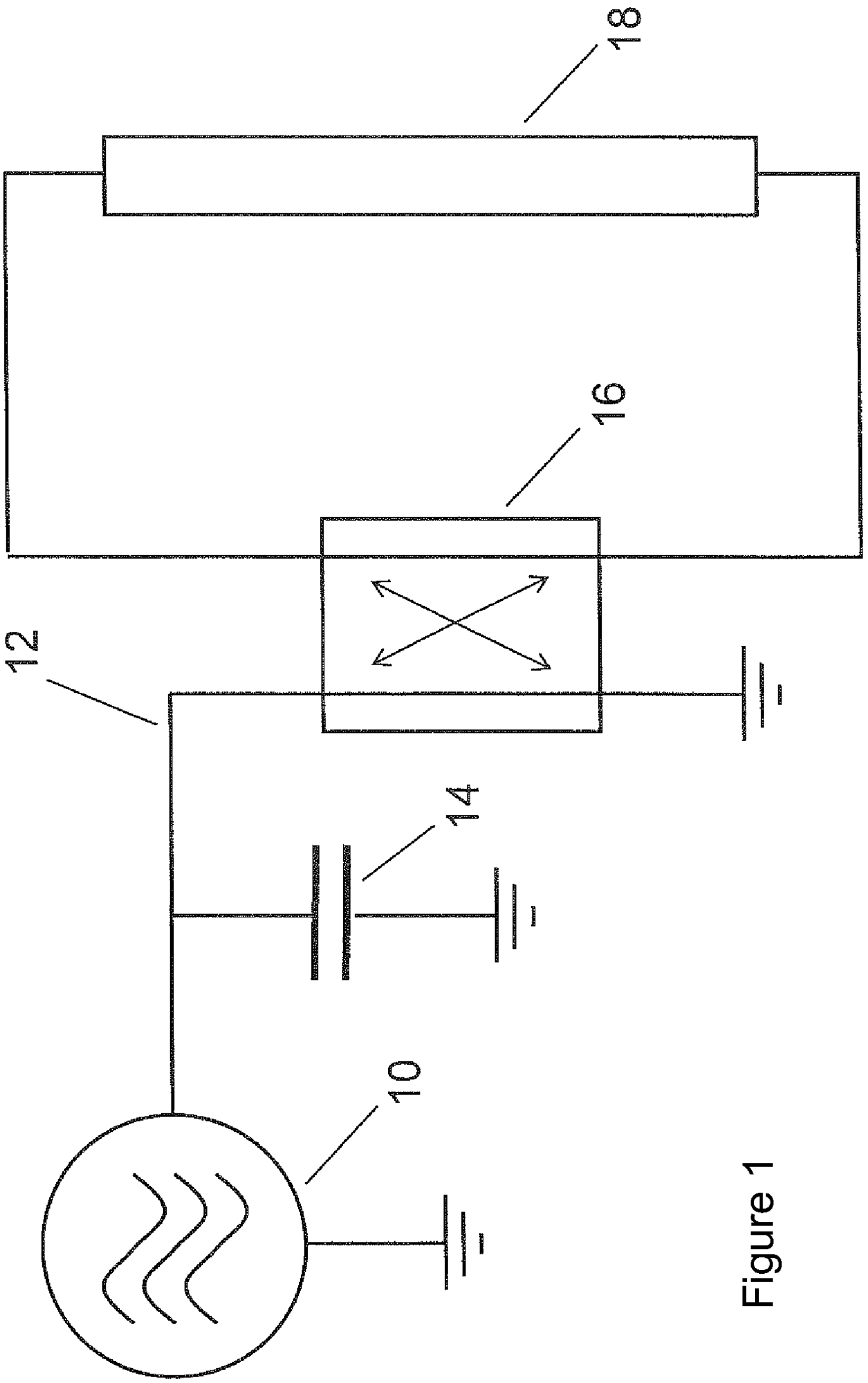
FIG. 1 shows a block diagram of a device for generating a plasma according to the invention.
Figure 5:
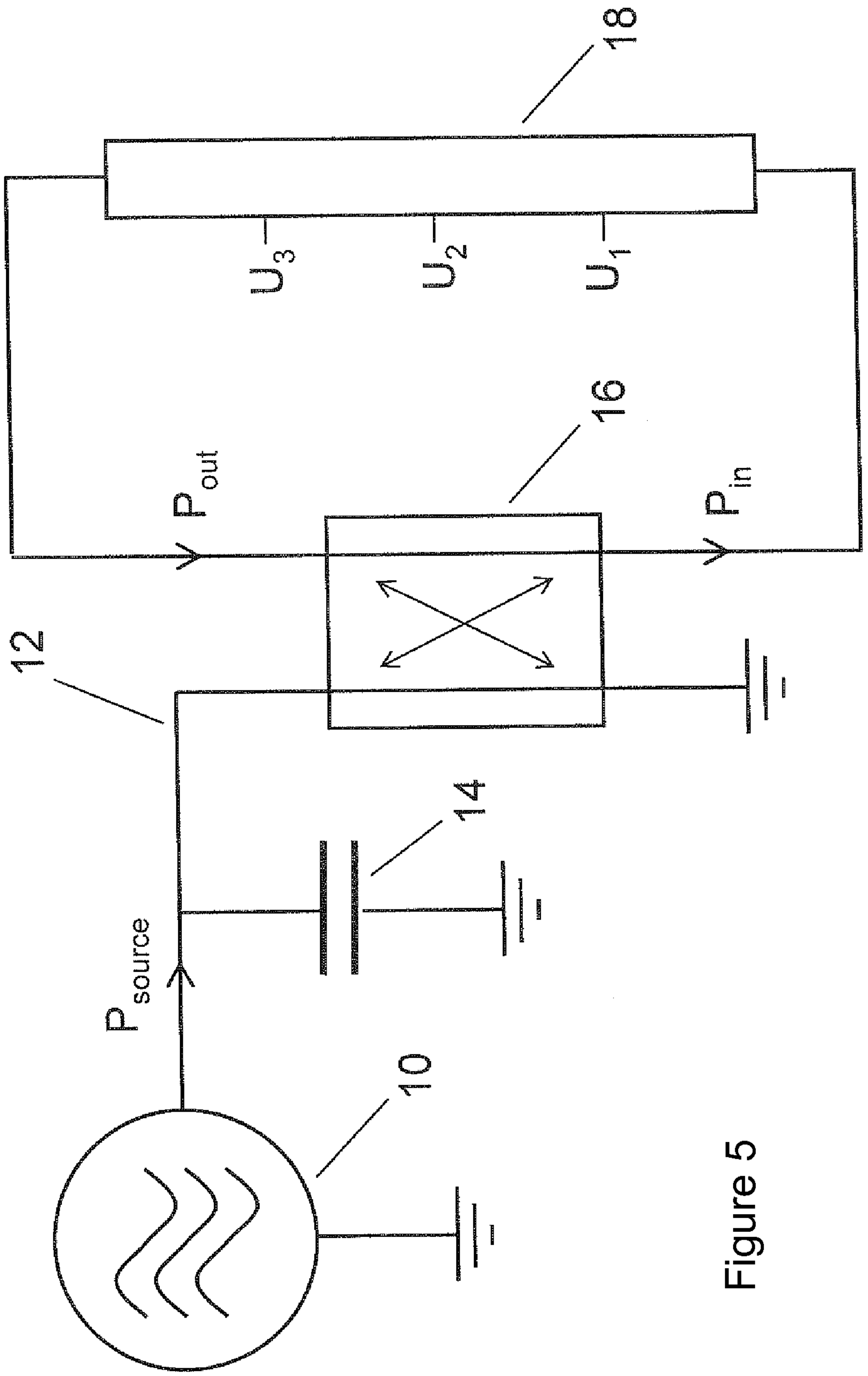
Figure 6:
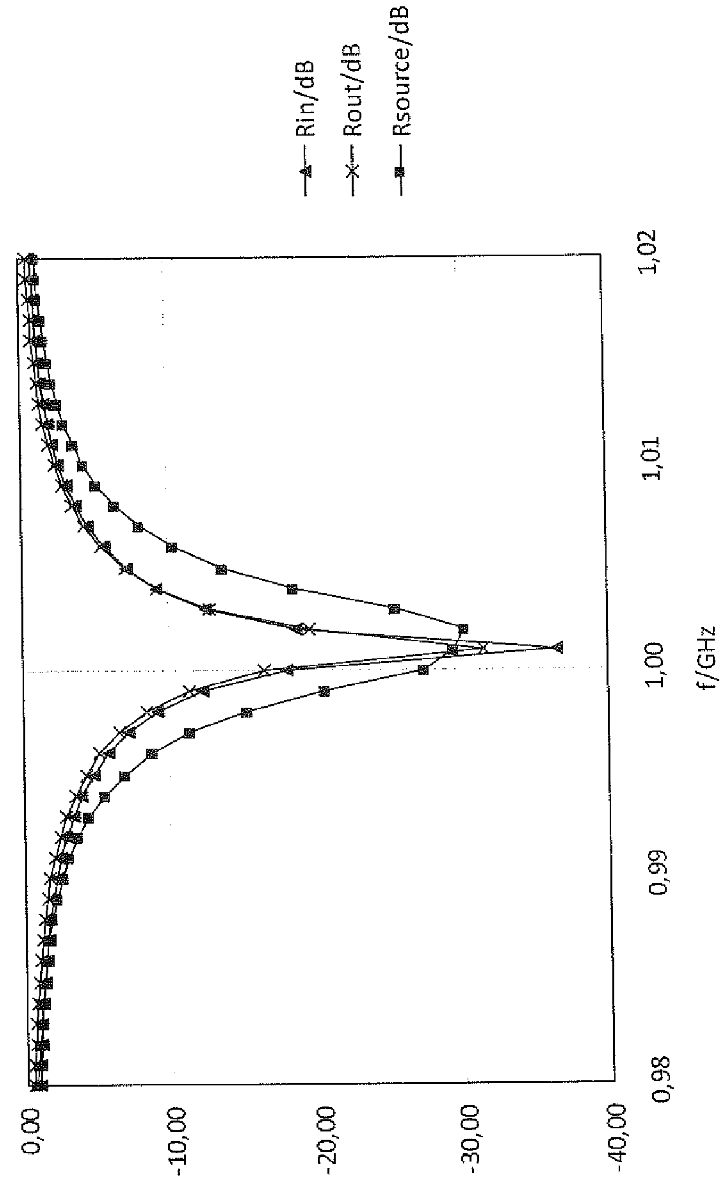
Figure 7:
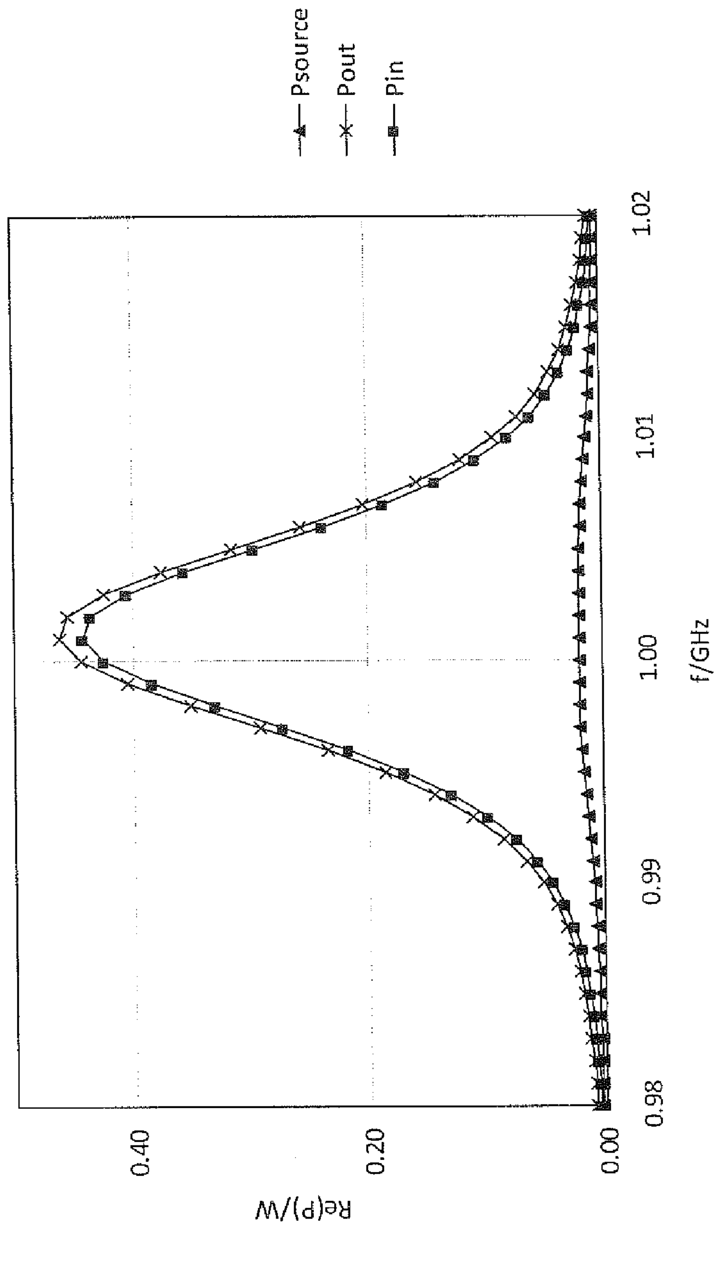
Figure 8:
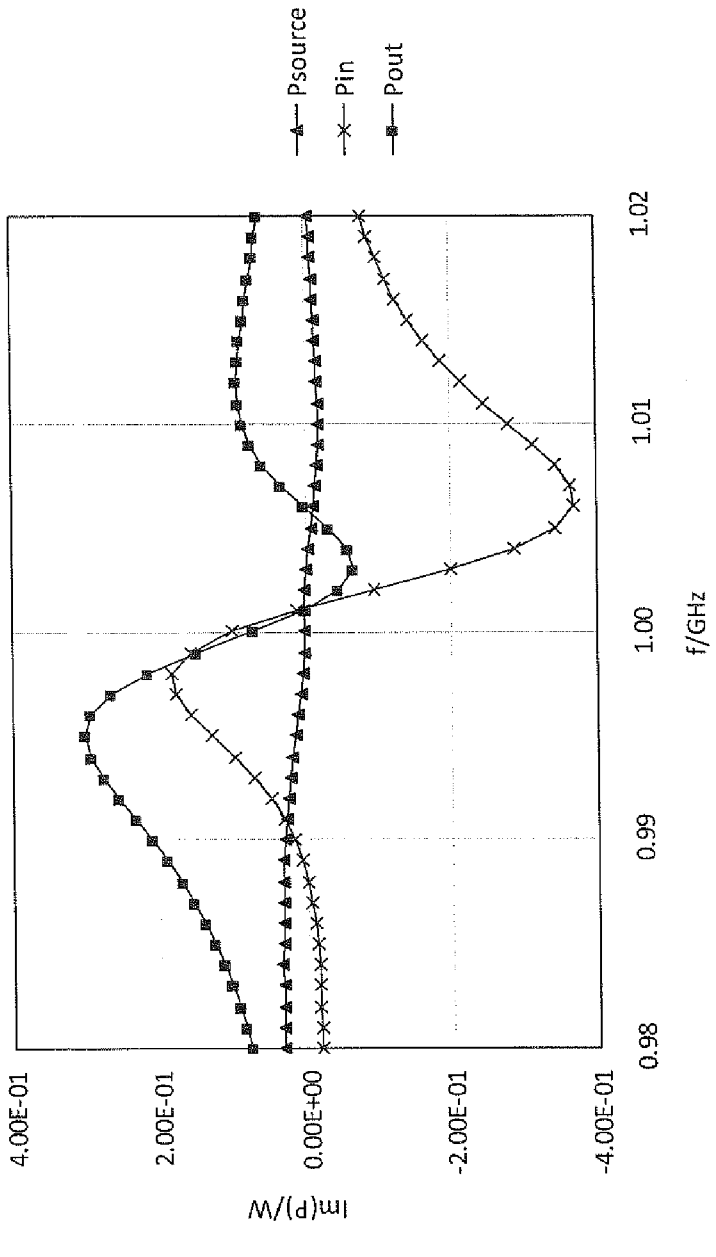
Figure 9:
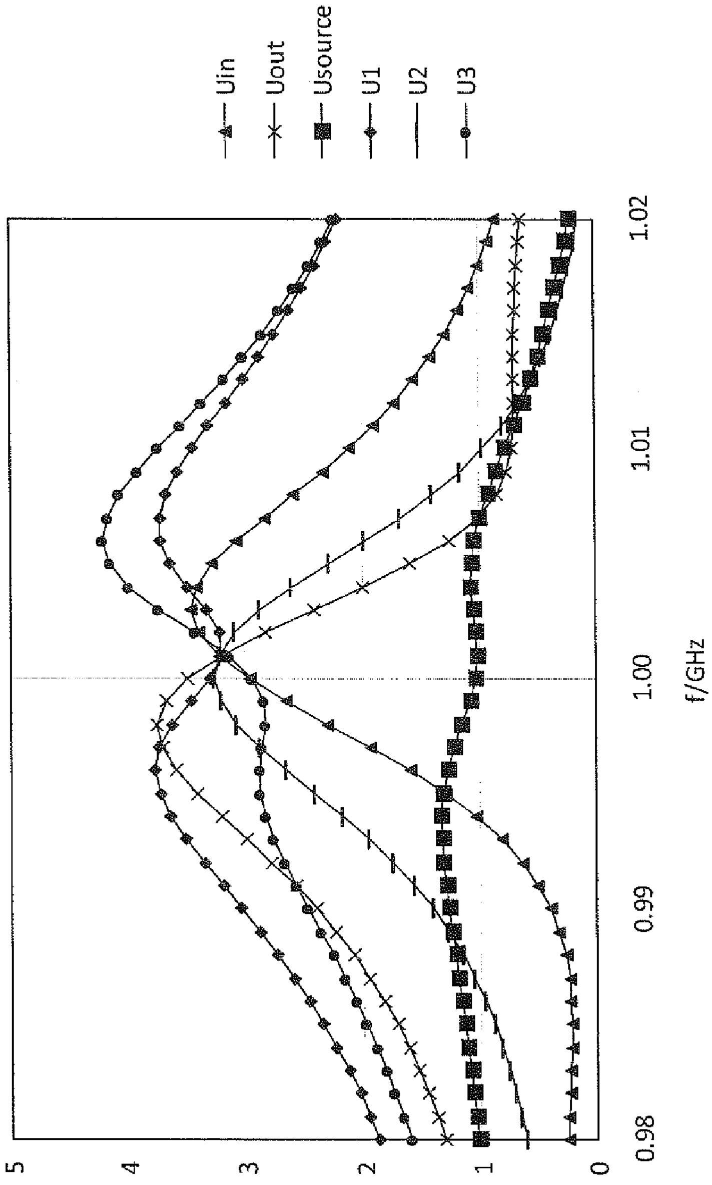

FIG. 4*a-h* show cross-sectional views of exemplary embodiments of travelling wave resonators according to the invention;

FIG. 5 shows the block diagram of FIG. 1 with parameters simulated for an exemplary embodiment using strip line technology;

FIG. 6 shows reflection factors for the exemplary embodiment using strip line technology in accordance with the frequency of the alternating voltage source;

FIG. 7 shows effective power flows for the exemplary embodiment using strip line technology in accordance with the frequency of the alternating voltage source;

FIG. 8 shows blind power flows for the exemplary embodiment using strip line technology in accordance with the frequency of the alternating voltage source; and FIG. 9 shows voltages for the exemplary embodiment using strip line technology in accordance with the frequency of the alternating voltage source.

FIG. 1 shows a block diagram of a device for generating a plasma according to the invention. An alternating voltage source 10, for example a high-frequency generator, generates an alternating voltage that is applied to one end of a line 12 whose other end is short-circuited. A capacitor 14 is provided for impedance adjustment. A directional coupler 16 couples the line 12 to a resonator line 18. The resonator line 18 is designed as a closed loop and does not require a final resistance, thus avoiding dissipative losses in a final resistance. Any desired coupling elements with a directional characteristic can be used for the directional coupler 16. Many possible embodiments of such directional couplers are described in the relevant literature, including hole couplers, line couplers, coupling loops extending in a transverse or longitudinal direction, hollow-conductor couplers and line branches. Said coupling elements can be provided once or arranged several times along the length of the line. Any desired waveguide that is designed as a closed loop can be used as a resonator line. Examples include a slotted tube, a strip line, a coaxial line, a ribbon conductor or other hollow or two-wire lines.

Depending on the type of resonator line, there are preferably two locations or areas that are close to each other and where the electric potential of the electromagnetic waves is in phase opposition. In case of a slotted tube, these are the opposite edges of the slot. In case of a strip line, two opposite strips can be placed at a small distance from each other. In case of a coaxial line, the inner conductor can be arranged close to the boundary of the outer conductor, so that it is no longer coaxial with said outer conductor.

Figure 2:
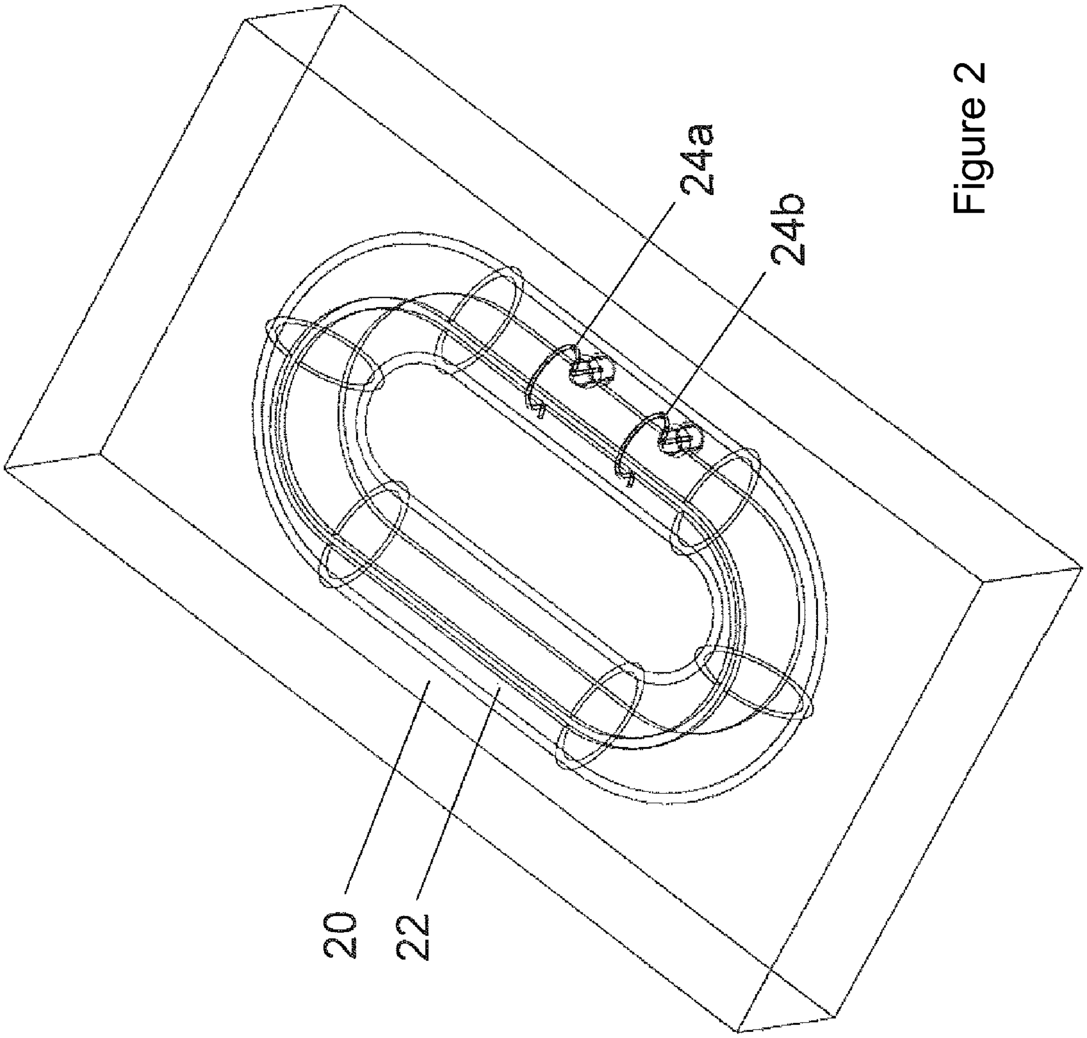
FIG. 2 shows a perspective view of an exemplary embodiment of a directional coupler and a travelling wave resonator according to the invention.

An exemplary embodiment of a directional coupler and a travelling wave resonator according to the present invention is shown in FIG. 2. Here, the resonator line is made up of a closed-loop tube 20 with a slot 22. Coupling is done by means of two conductor loops 24*a* and 24*b* that are arranged coaxially at an approximate distance of a quarter of the wavelength from each other and where two signals are applied that are in corresponding phase opposition of approximately $\pi/2$ to each other. As a result of said phase relation, the wave components initiated by the conductor loops in both directions interfere in a constructive manner in one direction and in a destructive manner in the other direction, thus producing a travelling wave in the resonator.

In this exemplary embodiment, the resonator line has a circular cross-section. Other embodiments are possible; the cross-section of the waveguide can have, for example, an elliptic or rectangular design.

The resonator line shown in the figure has the shape of an oval consisting of two semicircular and two linear parts. An appropriate selection of the length of the resonator part allows to carry out linear plasma treatment with two treatment zones. This embodiment is particularly advantageous for homogeneous treatment. There will be a certain inhomogeneity since the wave weakens during circulation, due to the power transferred to the plasma and as a result of line losses. As said effect occurs in both directions, it largely neutralizes itself. This means, a long, homogeneous and linear plasma source can be provided. Large substrates can be moved past said plasma source to carry out treatment. As an alternative, said source can be moved across large substrates.

As an alternative to the embodiment shown in the figure, coupling can also be done into the semicircular line parts, so that both linear line parts are fully available for plasma treatment. Another possible shape comprises alternating quadrant-shaped and linear line parts, wherein each two opposite linear line parts have the same length. Coupling would preferably be done into one of the shorter linear line parts in this case to make the longer linear line parts fully available for plasma treatment. The linear line parts used for plasma treatment can have a length of several meters, for example a length between 2 m and 5 m. If a process gas inlet is provided, said inlet can also be installed on one of the semicircular parts or one of the shorter linear parts.

Other embodiments are possible, for example a round, rotationally symmetric arrangement of the line. To provide more treatment zones, the line can be arranged, for example, in meanders. A meandering line can also be used to provide large-surface treatment zones. Furthermore, a part of the resonator line can be designed as a normal waveguide without plasma rather than as a plasma source zone. This allows to design large-surface treatment zones as round or angular spirals and to provide a plasma-free return line to close the resonator circuit.

As an alternative or in addition, several points of power input can be provided to homogenize distribution across the source. Furthermore, it is possible to introduce a defined interference that causes a standing wave component which is used to homogenize the source.

Figure 3:
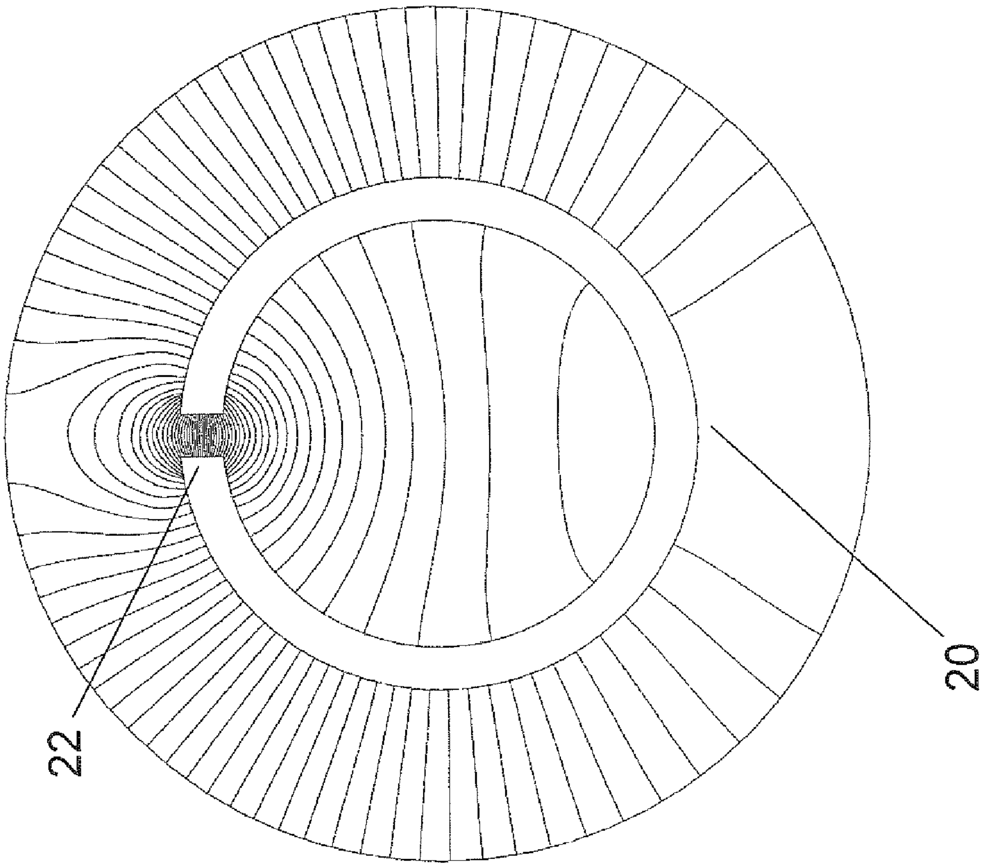
FIG. 3 shows a cross-sectional view of the electric field lines in the lowest mode of the travelling wave resonator shown in FIG. 2.

FIG. 3 shows the electric field lines in the lowest mode of the travelling wave resonator shown in FIG. 2 in the cross-section of the tube 20. In this example, the diameter of the tube 20 is 2 cm and the operating frequency is 2.5 GHz. The mode shown in the figure has high electric field strength in the slot 22, which is particularly suitable for use as a plasma source. The diameter of the line must be selected in such a manner that at least one mode is able to propagate at the operating frequency (the resonance frequency). A large increase in field strength is achieved if the diameter of the tube is selected in such a manner that the circumference is approximately half the effective wavelength of the operating frequency. A short segment of this waveguide can then itself be regarded as a λ/2 resonator again, at the open ends of which there is a maximum voltage difference in the opposite mode.

Figure 4A:
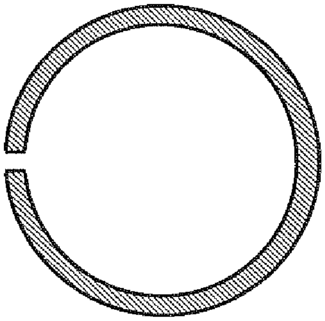
Figure 4B:
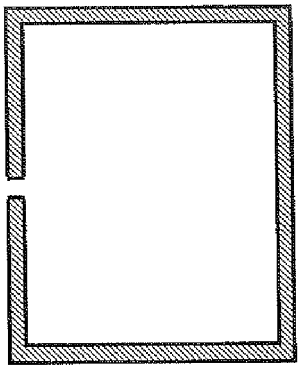
Figure 4C:
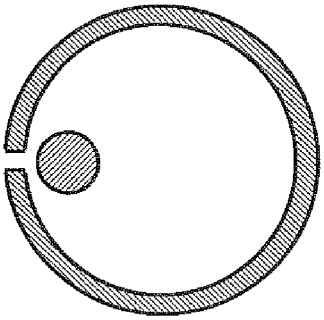
Figure 4D:
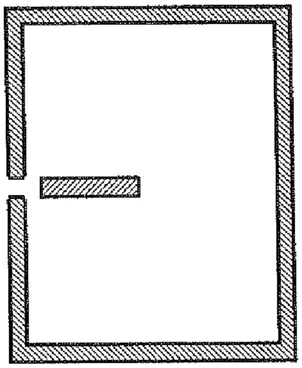
Figure 4E:
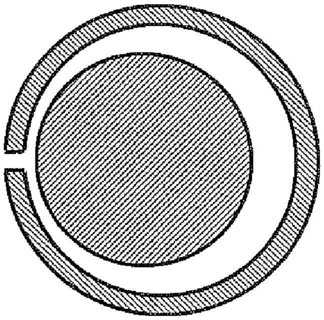
Figure 4F:
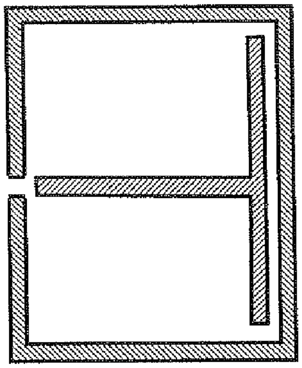
Figure 4G:
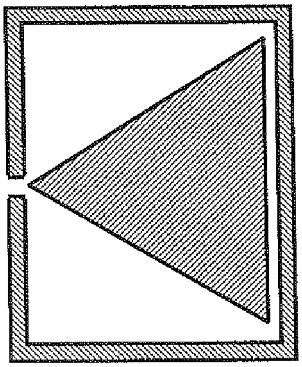
Figure 4H:
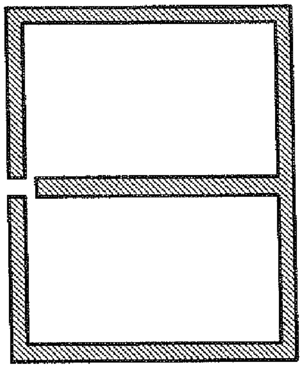

FIGS. 4*a* to 4*h* show different exemplary embodiments for the cross-section of the resonator line. FIG. 4*a* shows a round tube with a slot. FIG. 4*b* shows a rectangular tube with a slot. FIG. 4*c* shows a round tube with a slot and an inner conductor, wherein said inner conductor is not coaxial with the round tube, but arranged close to the slot. FIG. 4*d* shows a rectangular tube with a slot and an inner conductor; again, the inner conductor is arranged close to the slot. FIG. 4*e* shows another round tube with a slot and an inner conductor. In this exemplary embodiment, the inner conductor has a larger diameter than in the exemplary embodiment shown in FIG. 4*c*, which serves to increase capacity. FIG. 4*f* shows another rectangular tube with a slot and an inner conductor; again, the capacity is increased as a result of the changed shape of the inner conductor, compared to the exemplary embodiment shown in FIG. 4*d*. FIG. 4*g* shows a round tube with a slot and a triangular inner conductor. FIG. 4*h* shows a hollow conductor including a ridge and a slot, which is also referred to as "ridge waveguide".

The structures shown in FIGS. 4*a* and 4*b* are basic structures. To reduce radiation of electromagnetic energy to the outside, it must be ensured that there is no large potential difference at the outer slot. Said potential difference can also be built up towards another electrode part arranged inside, such as is shown in FIGS. 4*c* to 4*h*. Waveguides comprising two electrodes, such as are shown, for example, in FIGS. 4*c* to 4*g*, are interesting since their resonance characteristics can be adjusted by varying their geometry. Some such variations of geometry are shown in FIGS. 4*e* to 4*g*.

Below, some simulation results for an exemplary embodiment using strip line technology are shown, which were calculated by means of the ADS simulation program. In FIG. 5, the simulated parameters are indicated in the block diagram of FIG. 1. The alternating voltage source 10 feeds the power $P_{source}$ into the line 12, which power results from the voltage $U_{source}$ and the current $I_{source}$ according to $P_{source}=U_{source}I_{source}{}^*$, wherein $I_{source}{}^*$ is the complex conjugate of the current $I_{source}$. Immediately behind the directional coupler 16, in the direction of propagation, the power $P_{in}$ flows into the resonator line, which power results from the voltage $U_{in}$ and the current according to $P_{in}=U_{in}I_{in}{}^*$. Immediately in front of the directional coupler 16, in the direction of propagation, the power $P_{out}$ flows out of the resonator line, which power results from the voltage $U_{out}$ and the current $I_{out}$ according to $P_{out}=U_{out}I_{out}$. In addition, three voltages $U_1$, $U_2$ and $U_3$ are determined along the resonator line. Four line elements are simulated, each of which is located between the locations where the five voltages $U_{in}$, $U_1$, $U_2$, $U_3$ and $U_{out}$ are determined. The voltages and currents are used to determine the impedances $Z=U/I$ and the reflection factors $R=(Z-Z_R)/(Z+Z_R)$ in each case, wherein $Z_R$ is a suitable reference impedance in each case. In case of the source impedance $Z_{source}$, the reference impedance is a function of the internal resistance $Z_0$ of the alternating voltage source 10, whose value was assumed to be 50Ω; in case of the input and output impedances $Z_{in}$ and $Z_{out}$, it is a function of the wave resistance $Z_L$ of the resonator line, whose value was assumed to be 22Ω. To be specific, the following is true for the source: $Z_{source}=U_{source}/I_{source}$ and $R_{source}=(Z_{source}-Z_0)/(Z_{source}-Z_0)$, for the input: $Z_{in}=U_{in}/I_{in}$ and $R_{in}=(Z_{in}-Z_L)/(Z_{in}+Z_L)$, and for the output: $Z_{out}=U_{out}/I_{out}$ and $R_{out}=(Z_{out}-Z_L)/(Z_{out}+Z_L)$.

FIG. 6 shows the reflection factors $R_{source}$, $R_{in}$ and $R_{out}$ as a function of the frequency f of the alternating voltage source. Resonance frequency is at f=1.001 GHz. At this frequency, $R_{source}$ is very low, i.e. the source is properly adjusted. Likewise, the coupling structure feeding the line is properly adjusted ($R_{in}$ is low) and the output of the line is properly adapted to the coupler ($R_{out}$ is low). As a result, there is/are little reflection and few standing waves in the system.

FIG. 7 shows the effective power flows, i.e. the real parts of the powers $P_{source}$, $P_{in}$ and $P_{out}$, again as a function of the frequency f. At the resonance frequency, the source is properly adjusted to 50Ω, the input voltage at the coupler is 1 V and power output by the source is 0.02 W. Effective power input into the line is 0.46 W, effective power output is 0.44 W; the losses along the line amount to 0.02 W, corresponding to the power output by the source. This means, in case of the line losses selected here, a power increase by a factor of 20 is achieved; the power circulating in the resonator line is 20 times the input power.

FIG. 8 shows the blind power flows, i.e. the imaginary parts of the powers $P_{source}$, $P_{in}$ and $P_{out}$, again as a function of the frequency f. At the resonance frequency, the blind powers disappear, i.e. only effective power will flow. This confirms that the power indeed circulates.

FIG. 9 shows the voltages $U_{in}$, $U_1$, $U_2$, $U_3$, $U_{out}$ and $U_{source}$, again as a function of the frequency f. At the resonance frequency, the voltage at the input of the coupler is 1 V; all voltages along the line are close to each other around 3.2 V. This confirms that there is a circulating wave with a standing wave ratio of almost 1.

LIST OF REFERENCE NUMERALS

10 Alternating voltage source
12 Line
14 Capacitor
16 Directional coupler
18 Resonator line
20 Tube
22 Slot
24*a, b* Conductor loop

The invention claimed is:

1. A device for generating a plasma, comprising an alternating voltage source, the device comprising:

a traveling wave resonator; and coupling means designed to couple the alternating voltage generated by the alternating voltage source into the traveling wave resonator in such a manner that traveling electromagnetic waves are produced, wherein the traveling wave resonator is designed to increase the electric field strength of the traveling electromagnetic waves in such a manner that a plasma is ignited in a gas;

wherein the traveling wave resonator comprises a closed-loop waveguide, wherein the travelling wave resonator comprises a closed-looped tube that is provided with a slot and dimensioned in such a manner that the electric potential of the electromagnetic waves is essentially in phase opposition at the two opposite edges of the slot in the operating state.

2. The device according to claim 1, wherein a distance between two areas of the traveling wave resonator where the electric potential of the electromagnetic waves is essentially in phase opposition in the operating state is small enough to ensure that the electric field strength between the two areas is sufficient to ignite a plasma in the gas in the operating state.

3. The device according to claim 1, wherein the device further comprises a process gas inlet for supplying a process gas into the area of plasma ignition.

4. The device according to claim 1, wherein the circumference of the tube is half the wavelength corresponding to the frequency of the alternating voltage source.

5. The device according to claim 1, wherein the coupling means comprise two conductor loops that are arranged coaxially.

6. The device according to claim 5, wherein the distance between the two conductor loops is a quarter of the wavelength corresponding to the frequency of the alternating voltage source.

7. The device according to claim 5, wherein the two conductor loops are arranged on a linear part.

8. A device according to claim 1, wherein the tube comprises four quadrant-shaped parts, wherein a linear part is arranged between each two of said quadrant-shaped parts.

9. The device according to claim 1, wherein coupling is done into several areas of the traveling wave resonator.

10. The device according to claim 1, wherein the traveling wave resonator comprises a strip line comprising at least two strips, wherein the electric potential of the electromagnetic waves is essentially in phase opposition in two opposite areas of the at least two strips in the operating state.

11. The device according to claim 1, wherein the traveling wave resonator comprises a line comprising an inner conductor and an outer conductor that surrounds the inner conductor at least partly, wherein the inner conductor is not coaxial with the outer conductor.

12. A method for generating a plasma, the method comprising:
generating an alternating voltage;
generating traveling electromagnetic waves in a traveling wave resonator by coupling the alternating voltage into the traveling wave resonator, wherein the traveling wave resonator comprises a closed-loop waveguide; and
increasing the electric field strength of the traveling electromagnetic waves in the traveling wave resonator in order to ignite a plasma in a gas,
wherein the travelling wave resonator comprises a closed-looped tube that is provided with a slot and dimensioned in such a manner that the electric potential of the electromagnetic waves is essentially in phase opposition at the two opposite edges of the slot in the operating state.

* * * * *